United States Patent [19]

Ragle

[11] 4,052,698
[45] Oct. 4, 1977

[54] MULTI-PARALLEL-CHANNEL ERROR CHECKING

[75] Inventor: Herbert U. Ragle, Thousand Oaks, Calif.

[73] Assignee: Burroughs Corporation, Detroit, Mich.

[21] Appl. No.: 559,048

[22] Filed: Mar. 17, 1975

[51] Int. Cl.² ............................................ G06F 11/12
[52] U.S. Cl. ........................................ 340/146.1 AL
[58] Field of Search ................ 340/146.1 AL, 146.1 F

[56] References Cited

U.S. PATENT DOCUMENTS

| | | | |
|---|---|---|---|
| 3,800,281 | 3/1974 | Devore et al. | 340/146.1 AL |
| 3,821,703 | 6/1974 | Devore et al. | 340/146.1 AL |
| 3,831,144 | 8/1974 | En | 340/146.1 AL |
| 3,851,306 | 11/1974 | Patel | 340/146.1 AL |
| 3,868,632 | 2/1975 | Hong et al. | 340/146.1 AL |

Primary Examiner—Charles E. Atkinson
Attorney, Agent, or Firm—Nathan Cass; Kevin R. Peterson; Edward J. Feeney, Jr.

[57] ABSTRACT

Disclosed is a technique for error checking in one channel or a pair of channels of a binary system in which communications is serial-by-character and parallel-by-bit, such as in digital computer-controlled magnetic tape peripherals. The system is shown as applied to the group coded recording (GCR) format and standard for half-inch, nine-track magnetic tape used for interchange among information processing systems (the USA Standard Code for Information Interchange). The technique employs equipment which generates and records on the tape, together with a set of information characters, a check (i.e., redundant) character and parity bits, the former resulting from the employment of a cyclic code and the latter being based on odd modulo 2 addition.

12 Claims, 7 Drawing Figures

FIG. 1.

FIG. 2 CONVERSION OF DATA WORDS TO STORAGE WORDS

| | | DATA HALF-WORDS | | STORAGE HALF-WORDS | |
|---|---|---|---|---|---|
| | | INFORMATION CHARS. | | | |
| TRACK | ORDER | D1 D2 D3 D4 | D5 D6 D7 E | | |
| 1 | $2^1$ | B B B B | B B B B | X X X X X | X X X X X |
| 2 | $2^4$ | B B B B | B B B B | X X X X X | X X X X X |
| 3 | $2^7$ | B B B B | B B B B  CHECK | X X X X X | X X X X X |
| 4 | PARITY | P P P P | P P P P  CHAR. | X X X X X | X X X X X |
| 5 | $2^3$ | B B B B | B B B B | X X X X X | X X X X X |
| 6 | $2^6$ | B B B B | B B B B | X X X X X | X X X X X |
| 7 | $2^0$ | B B B B | B B B B | X X X X X | X X X X X |
| 8 | $2^2$ | B B B B | B B B B | X X X X X | X X X X X |
| 9 | $2^5$ | B B B B | B B B B | X X X X X | X X X X X |
| | | BYTE | BYTE | BYTE | BYTE |

FIG. 3

| WORD BYTE VALUE | TAPED BYTE VALUE |
|---|---|
| 0 0 0 0 | 1 1 0 0 1 |
| 0 0 0 1 | 1 1 0 1 1 |
| 0 0 1 0 | 1 0 0 1 0 |
| 0 0 1 1 | 1 0 0 1 1 |
| 0 1 0 0 | 1 1 1 0 1 |
| 0 1 0 1 | 1 0 1 0 1 |
| 0 1 1 0 | 1 0 1 1 0 |
| 0 1 1 1 | 1 0 1 1 1 |
| 1 0 0 0 | 1 1 0 1 0 |
| 1 0 0 1 | 0 1 0 0 1 |
| 1 0 1 0 | 0 1 0 1 0 |
| 1 0 1 1 | 0 1 0 1 1 |
| 1 1 0 0 | 1 1 1 1 0 |
| 1 1 0 1 | 0 1 1 0 1 |
| 1 1 1 0 | 0 1 1 1 0 |
| 1 1 1 1 | 0 1 1 1 1 |

MULTI-PARALLEL-CHANNEL ERROR CHECKING

BACKGROUND OF THE INVENTION

There are presently available a number of well-documented techniques devoted to detection, location and correction of errors in binary coded information which is transmitted serially a bit at a time between remote stations. Such transmission is often over an imperfect communications network: ratio telegraphy is subject to atmospheric disturbances, telephony is subject to crosstalk and line noise, gating networks within a data processing computer are subject to spurious oscillations, a computer system involving cooperation between peripheral equipments is subject to intermittent loss of synchronization, etc. Such error handling techniques may be as limited as an odd-even parity check, capable only of detecting an odd or even number of errors, or as potent as burst checking systems capable of correcting a plurality of combinational types of error. In order to provide a background which will serve to distinguish the contribution of the present invention, some of these sytems will be reviewed briefly.

The parity check adds, usually, a check bit to the information bits and all bits are transmitted as a train of signals, each signal representing one bit. For example, for an even parity check, the value of the check bit is chosen so that each transmitted data group comprises an even number of binary 1 bits (i.e., the modulo 2 sum of the data group is computed). On reception of the data group, the presence of an odd sum indicates that an odd number of errors has occurred. This system cannot detect an even number of errors, it cannot indicate the location of errors within the data group and it cannot correct them without calling for the retransmission of the data group.

An advantage of prime significance beyond the above is a system which locates and corrects a single transmission error in a data group by generating ("encoding") and transmitting a plurality of "locator" parity bits which are a function of the bits in selected bit positions of the data group. The selection sequence, for data groups in which locator parity bits follow information bits in transmission, resembles a binary counting sequence and the function is, as with the parity check, the modulo 2 sum. In operation, if a parity check ("decoding") produces a count of 0 for each selection of bits, no error was made, but if the result is otherwise, a combined count comprising all selection counts will indicate the bit position of the data group occupied by the bit in error. This system has been extended to detection of a double error by adding another "error-type" parity bit which checks all bit positions of the data group.

Both single error correction and double error detection are also achieved by selection of bit positions in accordance with a shift sequence; a considerable practical advantage thereof is that mechanization of the parity checks may be by a shift register having an "exclusive OR" feedback connection from one or more of the stages such that the register count recycle. Since more than one cyclic sequence may be generated by registers having at least three stages and this type of feedback connection, it is immaterial which sequence is employed provided that both the encoder at the transmitting station and the decoder at the receiving station use the same one. Further, this approach has been extended to checking errors in other combinations of bits by adding an additional locator parity bit and an additional error-type parity bit. Both the locator and error-type bits are chosen by cyclic sequence selections of bit positions of the data group and thus two sequence generators are required.

It is, of course, known that many other codes may be derived to accomplish the objects of error detection, location and correction. The basis for the high regard attached to cyclic coding and decoding is the simplicity of the circuitry with which they may be mechanized, namely, with shift registers incorporating one or more module 2 or complemented modulo 2 feedback connections, i.e., exclusive "OR" connections.

A typical application of this technique is to the problem of transmission fidelity for a system involving parallel-by-bit, serial-by-character transmission of digital information such as widely found in magnetic tape, punched cards and buffer equipment used for communication with high speed computers, in parallel computers themselves, etc., for which one of the intents of the design is to speed operation by providing a plurality of communications paths operating on a plurality of information simultaneously. Thus, a magnetic tape unit capable of, for instance, 9-channel storage, may have a sensing multiple head which generates 9 bits simultaneously (which together may represent a character), one on each of 9 lines communicating with a computer arithmetic unit; a plurality of characters are generated sequentially and may further be divided into sequences of words, each, usually, comprising the same number of characters.

For this type of system, several techniques have been employed to permit correction of errors in a single channel (such as sensed by the head of a track of a multi-track tape); these generally involved various coding techniques to identify the track having erroneous bits and then a parity track to determine parity over the corresponding bits in all the channels (i.e., the character) and so determine the errors. The coding techniques include cyclic and longitudinal redundancy, residue, diagonal, orthogonal, etc., capable of detecting and correcting many error patterns.

In order to accomplish error checking in a plurality of tracks, these techniques have been extended to generate additional information: pointers (i.e., indicators) identify tracks having a high error probability. These pointers may be based on one or several of tape system parameters: amplitude less than a preset threshold, excessive phase shift, skew and tape speed variation and, where there is code conversion in recording and sensing, the recognition of invalid code combinations. However the advantage must be weighed against the economics of the additional structure to provide the inclusion of such facilities.

SUMMARY OF THE INVENTION

The system of the present invention is embodied in an interface unit which is capable of detecting that, in a word transferred between, for instance, a computer and a magnetic tape unit, one or two bits of the characters (i.e., one or two channels) are affected by error, of locating the characters in error and of correcting them by generating their correct counterparts and substituting the latter for the former. The invention contemplates the transmission from and to a host computer, of complete words of information, comprising, in the embodiment selected for particular description, for instances, seven eight-bit characters, to each of which one bit of parity (carried by another channel) is added while one character devoted to error checking is added to the word. However, it is to be understood that the present system is easily adaptable to characters of any plurality of bit content and words of any character length, provided that the word length does not exceed the number of distinct character combinations which may be used in the word. The error checking character is preferably transmitted as the last character of the word. Thus, an 8-character word of 9-bit characters will comprise 7 sequential information-representing characters followed by a check character, and each of the characters may consist of 8 information bits and a parity bit. The check characters are generated through application of modified cyclic coding which, in cooperation with a vertical (i.e., transverse or character) parity computation, can detect error bursts of any length in any of the nine tracks; furthermore, the polynomials for the check character have been chosen to overlap in their error detection capabilities to insure optimum effectiveness. In addition, the check characters, when supported by parity and the track pointers, and mechanized as taught by the invention, can correct errors in a pair of tracks.

DESCRIPTION OF THE DRAWINGS

FIG. 7 is a more detailed block diagram of the FIG. 6 error check unit.

DESCRIPTION OF THE PREFERRED EMBODIMENT

Before embarking on a detailed description of the preferred embodiment of the invention, it may be appropriate to provide some comments on the generic handling of binary information by a magnetic tape system.

Figure 1:
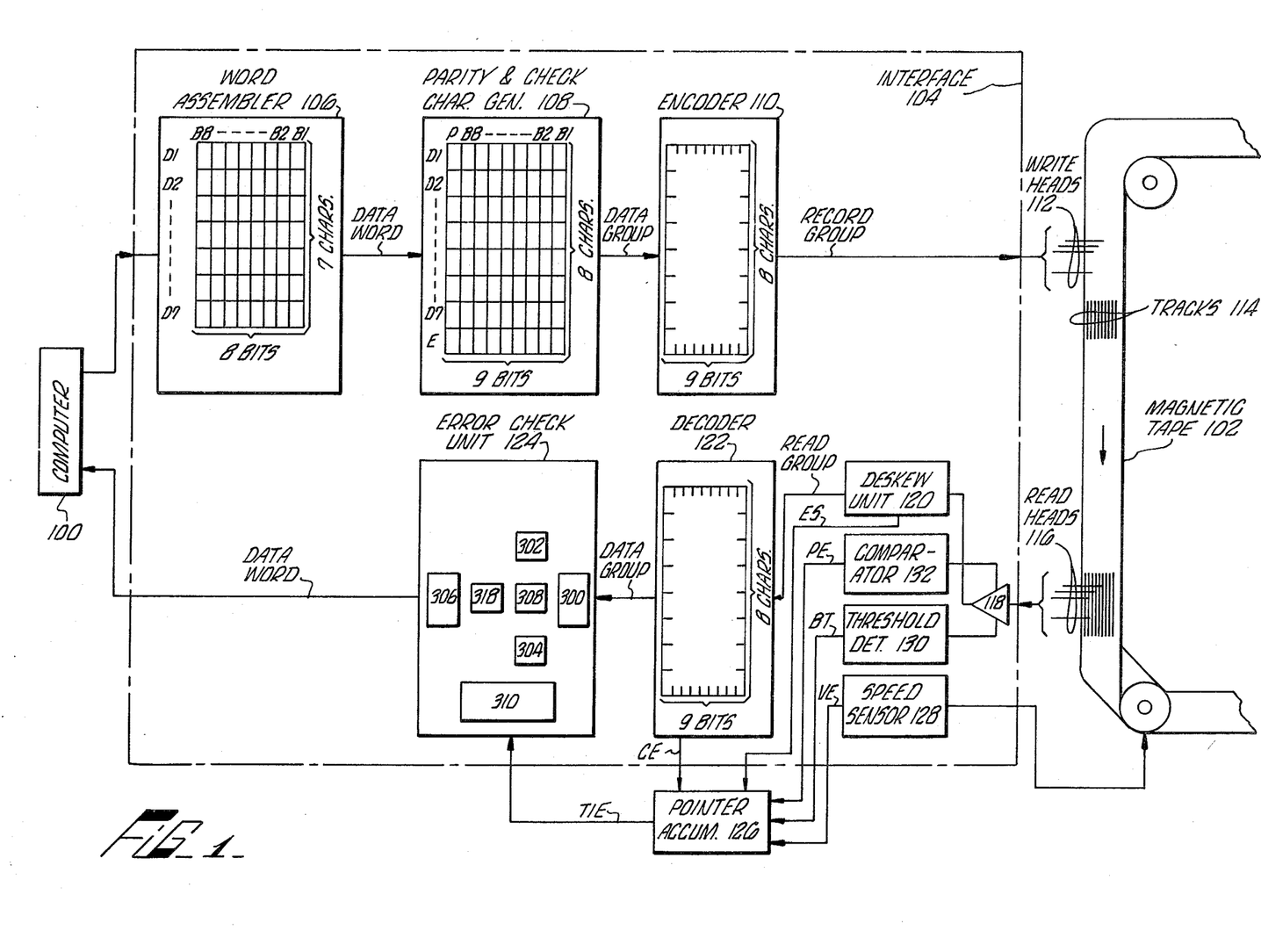
FIG. 1 comprises a block diagram of the interface of the present invention as interposed between a computer and a magnetic tape unit.

FIG. 1 abstracts such a system cooperating with digital computer 100, providing storage therefor on magnetic tape 102, signals being intercommunicated via interface 104. It is the function of interface 104 not only to provide signal paths but also to enhance and modify the signals for error checking (and other purposes not relevant here) and to provide other signals (the aforementioned pointers) for use by its error checking circuits.

Typically, interface 104 would receive the eight bits of sequential characters from computer 100 at word assembler 106 which forms a word of seven characters, designated as D1 through D7, each of eight bits, designated B1 through B8, and retransmits the word, again parallel-by-bit, serial-by-character, to parity (P) and error check character (C) generator 108; the latter computes an (odd) parity bit P for each character, thereby expanding it to 9 bits, and an error check character E for the word thereby expanding it to 8 characters. The 8-character by 9-bit matrix is then transferred to encoder 110 in which it is converted to a 10 by 9 matrix, and it is this matrix which received by 9 write heads 112 and recorded on tape 102.

Encoder 110 recognizes bytes of the matrix and translates them in value; the bytes are subsets of four bits of the same significance from a sequence of characters, no bit appearing in more than one subset. Thus, D1B1, D2B1, D3B1, D4B1 comprise a subset, D5B1, D6B1, D7B1, EB1 comprise another ... and D5P, D6P, D7P, EP comprise still another. This configuration, as well as the tape layout of the data word-to-storage word conversion is represented in FIG. 2; the conversion values associated with FIG. 2 are shown in FIG. 3.

In this code translation, it will be noted that, in the taped byte values, there are no more than two adjacent zeros and that there is never more than one zero leading or ending a code; these characteristics enable self-clocking and provide one basis for detecting errors in a track since any loss of readback signal strength creates zeros, thereby producing an invalid code. This will trigger track-in-error pointers (to be discussed).

Figure 2:
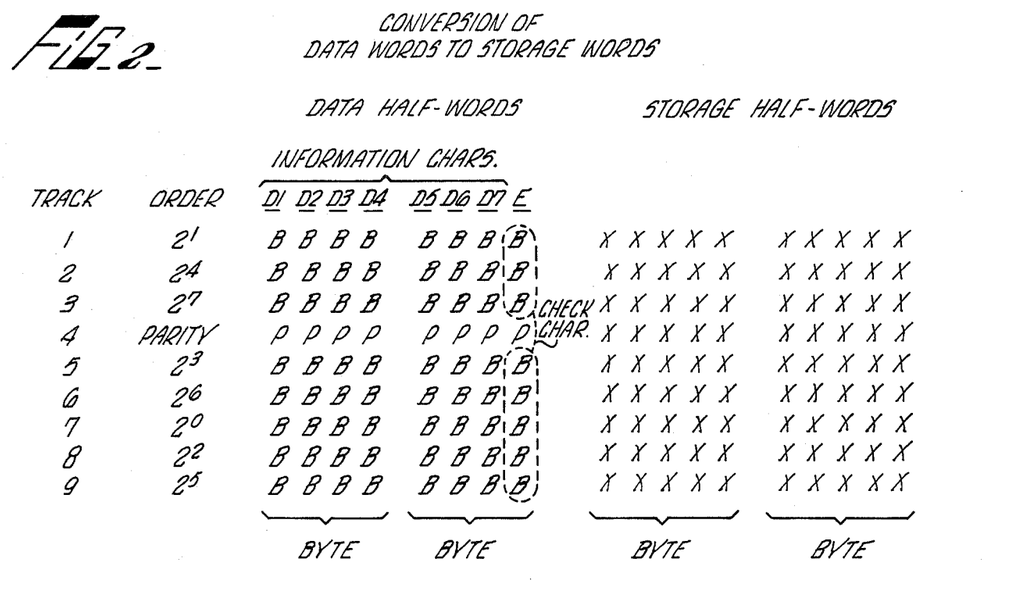
FIG. 2 indicates how the interface information is converted in form for recording on tape.
Figure 3:
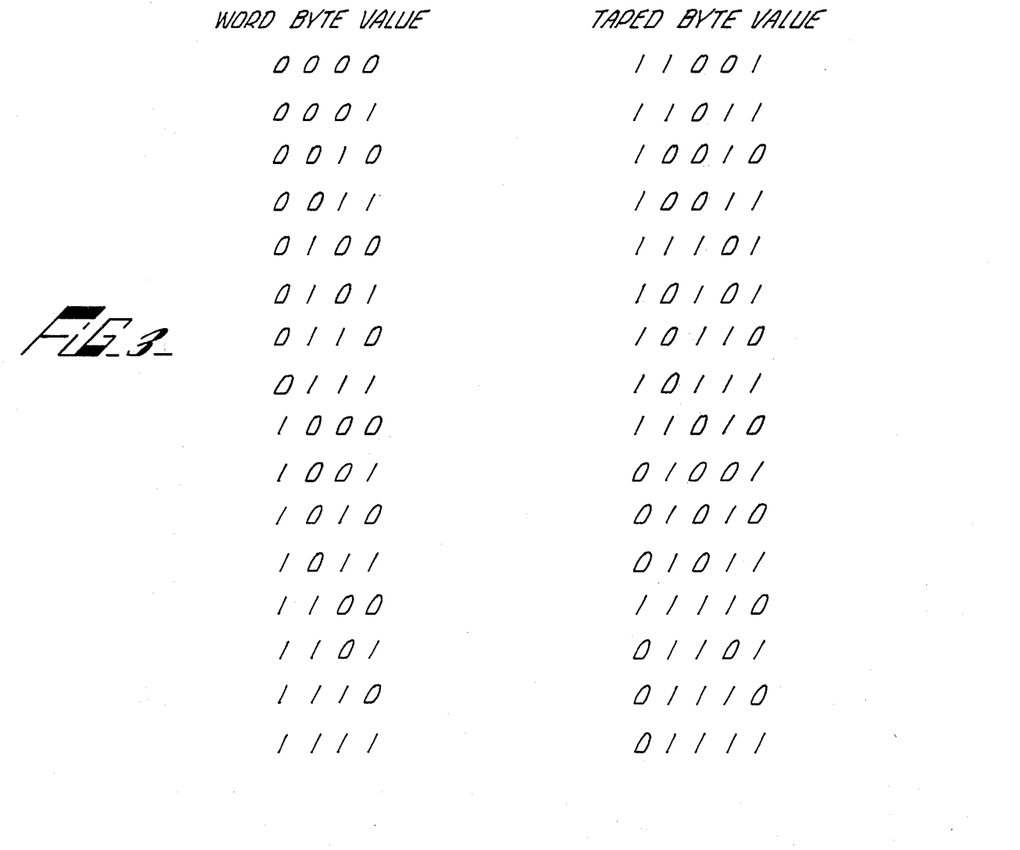
FIG. 3 tabulates the conversion values for FIG. 2.

It may also be noted from FIG. 2 that the recording process actually permutates the data-track relationship, i.e., the $2^0$ order of the data is actually carried by track 67, the $2^1$ order is in track 1, etc., and the character parity bit is recorded in track 4. Such permutation is common in tape systems and it and the restoration are generally handled in the recorder connections to its heads; accordingly, the permutation need not concern this specification.

Again referring to FIG. 1, as tape 102 travels in the direction of the arrow shown, the record takes the form of 9 longitudinal tracks 114, the information in which is sensed by 9 read heads 116 structured identically to and positioned symmetrically with write heads 112. The sensed matrix, after amplification in preamplifier 118, is set up in deskew unit 120 which aligns the characters; then, in decoder 122, it is retranslated to the 8 by 9 matrix form. The matrix is subsequently examined for error in error check unit 124, corrected if necessary and possible (i.e., within the constraints of the invention), and finally, returned to computer 100.

As the data is conveyed through the system, certain signals are generated, based not only on its content and form, but also on various characteristics of the system components. These signals comprise inputs to pointer accumulator 126 which compares them with pre-established presets to emit a track-in-error signal TIE (the aforementioned track pointer) for error check unit 124, if the data of a track is to be considered unreliable. The inputs may comprise any combination of the following: tape velocity error signal VE derived from tape speed sensor 128 associated with the drive means (not shown) of tape 102, below-threshold signal BT derived from threshold detector 130 at the output of preamplifier 118, phase error signal PE derived from phase comparator 132 also at the output of preamplifier 118, excess skew signal ES generated by deskew unit 120 and coding error signal CE generated by decoder 122. The generation of track-in-error pointer signals (here, signal TIE) from signals such as the aforementioned as well as signals (not shown) which enable synchronization (e.g., to correlate a particular signal TIE with the track under scrutiny by error check unit 124) and other control signals are believed sufficiently known in the art to require no discussion in this specification. Accordingly, attention will now be directed to considerations involving the error checking capabilities of the invention.

As is common in the literature, number representation herein will be in polynomial form and arithmetic will be modulo 2; also, in general, concern is with encoding information characters D comprising sequences of bits B by appending thereto sequences of check bits C with respect to the orders of the characters.

Thus, in FIG. 1, character E is formed by combining characters D1 through D7 with the operator polynomial F as follows:

$$F = D1\ X^7 + D2\ X^6 + D3\ X^5 + D4\ X^4 + D5\ X^3 + D6\ X^2 + D7\ X^1$$

This operation results in appending a number of zeros to each data character; the number corresponds to the value of the exponent of the sham variable $X$ associated with the character.

Polynomial $F$ is determined by the modulo 2 summation of coefficients of like powers of the polynomial representations of characters D1 through D7, and:

$$E = F \pmod{G}$$

where $G$, generator polynomial, has been selected as:

$$G = X^0 + X^3 + X^4 X^5 + X^8$$

Briefly, character E is the remainder after dividing polynomial F by polynomial G; it comprises 8 bits and is the last (here, eighth) character of the data group.

As example of the encoding-decoding operations in accordance with the above, using data characters consisting of all 1 bits and the generator polynomial $$G = 1 + X^3 + X^4 + X^5 + X^8 = 100111001$$

is tabulated as follows:

| | encode | | decode |
|---|---|---|---|
| mod 2 | 11111111 | D1 | 11111111 |
| | 11111111 | D2 | 11111111 |
| addition | 11111111 | D3 | 11111111 |
| | 11111111 | D4 | 11111111 |
| | 11111111 | D5 | 11111111 |
| | 11111111 | D6 | 11111111 |
| | 11111111 | D7 | 11111111 |
| | | E | 11010001 |
| | 010101011010101 | F | 100001001010101 |
| Division | − 100111001 | G | − 100111001 |
| by G | 011111011 | | 011011011 |
| | − 100111001 | G | − 100111001 |
| | 111100001 | | 011110001 |
| | − 100111001 | G | − 100111001 |
| | 010011011 | | 100111001 |
| | −100111001 | G | −100111001 |
| | 11010001  E (remainder) | | 000000000  EP (error pattern) |

If errors occur in manipulating the data group, the error pattern, designated EP, will be other than zero. Further, it can be seen that the 64 possible single bit errors in the (8 × 8) data matrix will result in 64 individual patterns EP and that all single bit errors in a column (of the modulo 2 addition) produce the same pattern EP (i.e. the same syndrome) which is different from the syndromes of all other columns, i.e., there are 15 unique syndromes.

Figure 4:
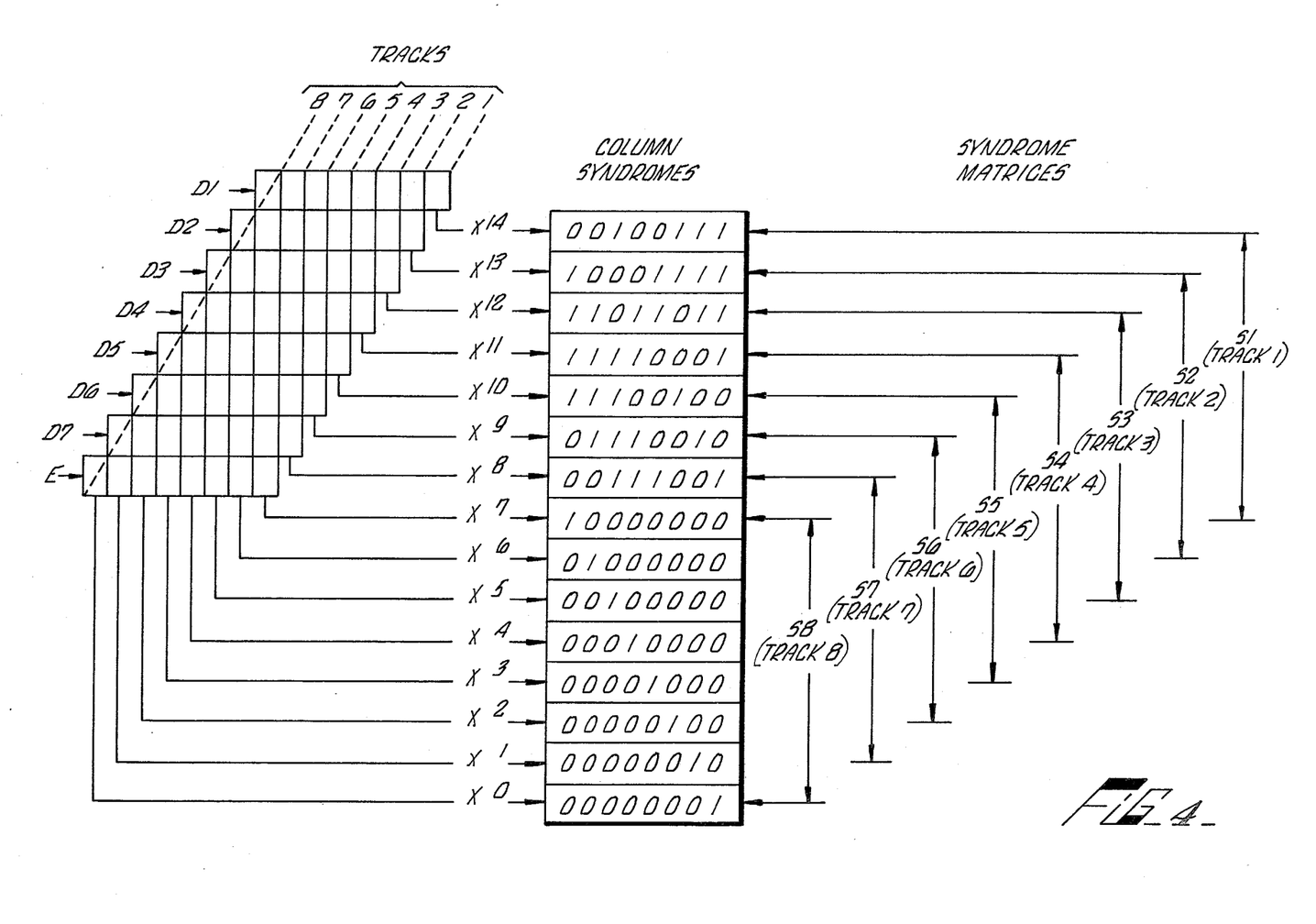
FIG. 4 correlates the data word with tape tracks and their corresponding error check syndromes.

The foregoing is pictorially represented in FIG. 4; it is apparent that the syndromes, designated $X^n$, are associated in sets of eight with the eight tracks, the sets, or matrices, being labelled S1 through S8. Thus, for example, track 8, transversed by a diagonal line in the figure, for single bit errors, is characterized by the eight syndromes $X^0$ through $X^7$, and this set is unique to track 8.

It follows, then that pattern EP(X) for a track X corresponds to the syndromes of the syndrome set for the bits in error added modulo 2; for single-track errors, of course, a parity computation (bits P of the data group) will indicate the track. Mathematically, this may be state as $$EP(X) = P \oplus S(X)$$

where
$EP(X) = EP$ for track X, $P$ = the parity indication,
$S(X)$ = the syndrome for track $X$,
$\oplus$ = matrix multiplication.

Also, since errors in the parity track (track 9) are the sum of the errors of all tracks, for a single track-in-error, the parity track errors equal the errors in that track; thus:

$$EP(X) = E(X) \oplus S(X)$$

where
$E(X)$ = the error vector which locates the bits in error.

Now it will be noted that each of the matrices S may be generated from another matrix S by shifting modulo (generator) polynomial G; consequently a track-in-error may be identified by shifting pattern EP in a linear feedback shift register.

It will be noted further tha the simple parity computation for the columns of the diagonalized data group (word with P and E bits appended by generator 108, FIG. 1) fails to provide for multiple errors; similarly, multiple syndromes S "mask" each other in pattern EP. Masking may occur in the parity P track and/or pattern EP. To discriminate and, for instance as contemplated by this specification, to locate and correct two tracks-s-in-error, information, additional to pattern EP and parity P, comprising a pair of signals TIE, are employed (by unit 124, FIG. 1).

For plural track error correction, pattern EP is the summation of patterns EP of the individual tracks; for two tracks X, Y:

$$EP = EP(X) \oplus EP(Y).$$

Parity error check vector P detects character parity errors in the same manner as vector E(X) detects track errors; it is the summation of error vectors E(1) through E(8). If it is assumed that two tracks X, Y are in error:

$P = E(X) \oplus E(Y)$ or $E(X) = P \oplus E(Y) = P \oplus EP(Y) \quad S(Y) = P \oplus [EP \oplus \cdot EP(X)] \oplus S(Y).$ Distributing $S(Y)$:

$E(X) = P \oplus EP \quad S(Y) \oplus EP(X) \quad S(Y) = P \oplus EP \oplus S(Y) \oplus [E(X) \oplus S(X)] \oplus S(Y).$ Subtracting $E(X) \oplus S(X) \oplus S(Y)$ from each side:

$E(X) \oplus E(X) \oplus S(X) \oplus S(Y) = P \oplus EP \oplus S(Y).$

Factoring:

$E(X) \oplus [I \oplus S(X) \oplus S(Y)] = P \oplus EP \oplus S(Y)$ where $I$ = the identity matrix.
Multiplying by $[I \oplus S(X) \oplus S(Y)]^{-1}$:
$E(X) = [P \oplus EP \oplus S(Y)] \oplus [I \oplus S(X) \oplus S(Y)]^{-1}.$ Once the errors in track $X$ are known, those in track $Y$ can be determined from: $E(Y) = P \oplus E(X)$.

The last two equations contemplate two-track correction of errors in this specification. These equations may be written in simpler form:

$E(X) = [P(X) \oplus EP \oplus K1] \oplus K2$ $E(Y) = P(X) \oplus E(X)$ where $K1 = S(Y)$, the syndrome matrix for track Y
$K2 = [I \oplus S(X) \oplus S(Y)]^{-1}$, the inverse matrix related to track separation between tracks X, Y.

The relationship of the expression K2 to the separation between the tracks follows from the observation that any pair of tracks-in-error characterized by the same separation (for instance, tracks 1, 4, tracks 3, 6, tracks 5, 8, each having a separation of 3 tracks) will be characterized by the same result of the matrix multiplication of their respective syndromes. For 8 tracks, there are 7 such products: one corresponds to the 7 track adjacencies, one corresponds to the 6 track pairs separated by a single track, one corresponds to the 5 track pairs separated by two tracks... and one corresponds to the track pair separated by all the other (7) tracks. These products need not be shown here except for those which the following examples involve.

The operation of the equations for two-track error correction will be exemplified with regard to an all 1's data word, in the handling of which errors are introduced in bit positions B4 and B6 (tracks 4 and 6, FIG. 1), the bits in error being indicated by dots over them:

| record group | | read group | |
|---|---|---|---|
| P (odd) | B8 - B1 | P (odd) | B8 - B1 |
| 1 | 11111111 | 1 | 1111 0 111 |
| 1 | 11111111 | 1 | 11111111 |
| 1 | 11111111 | 1 | 110 10 111 |
| 1 | 11111111 | 1 | 110 10 111 |
| 1 | 11111111 | 1 | 110 11111 |
| 1 | 11111111 | 1 | 110 10 111 |
| 1 | 11111111 | 1 | 1111 0 111 |
| 1 | 11010001 | 1 | 11010001 |

Vector P shows the locations of bad parity, a bit 1 in rows with bad parity and a bit 0 in rows with good parity:

$P = 10001010$ corresponding to bad parity in rows 1, 5, and 7 of the data group. Pattern EP is the error pattern computed from character E with the bad data:

$EP = 01010100$

Since tracks 4 and 6 have the errors in them K1 is syndrome matrix S6:

| S6 = | 01001110 |
|---|---|
| | 10011100 |
| | 00000001 |
| | 00000010 |
| | 00000100 |
| | 00001000 |
| | 00010000 |
| | 00100000 |

Computing:

$P \oplus EP \oplus K1 = 00011100.$

K2 corresponds to the matrix product for a track separation of two (tracks 4 and 6):

| K2 = | 10011010 |
|---|---|
| | 01001101 |
| | 10111010 |
| | 01011101 |
| | 10110010 |
| | 01011001 |
| | 10110000 |
| | 01011000 |

The positions of the errors in track 4(X) are:

$E(X) = 10110110$ and the errors in track 6(Y) are:

$E(Y) = P \oplus EX = 00111100$

For error correction, vectors $E(X)$ and $E(Y)$ are added to the data in tracks 4 and 6. The resulting corrected matrix is the all 1's data group.

If, however, one of the suspected tracks is the parity track, the situation may be regarded as a single-track problem involving one pointer TIE; another pointer TIE is employed to flag correction of the parity track. This is shown in the following example, which involves an arbitrary data group, in the handling of which errors are introduced in bit positions B2 and P (track 2 and parity track 9, FIG. 1):

| record group | | read group | |
|---|---|---|---|
| P (odd) | B8 – B1 | P | B8 – B1 |
| 1 | 00000100 | ? | 00000100 |
| 1 | 01000010 | ? | 01000000 |
| 1 | 11101101 | ? | 11101101 |
| 1 | 10001011 | ? | 10001001 |
| 1 | 10101011 | ? | 10100001 |
| 1 | 11000010 | ? | 11000010 |
| 1 | 01000011 | ? | 01000001 |
| 1 | 11100100 | ? | 11100100 |

Vector E(X) shows the locations of bits in error: a bit 1 in rows with errors and a bit 0 in rows with correct data. Vector EP, computed for the read group, is:

$$EP = 10110001$$

Since parity is unknown, the bits in error cannot be checked from the equation.

The syndrome matrix is S(2) since the errors are in track 2:

$$S(2) = \begin{array}{l}11110001\\11011011\\10001111\\00100111\\01001110\\10011100\\00000001\\00000010\end{array}$$

Computing:

$$E(X) = EP \oplus S(2) = 01011011.$$

For error correction, vector $E(X)$ is added to the data in track 2. The resulting corrected matrix is identical to the record group. Parity can now be corrected by computing vector P.

Figure 5:
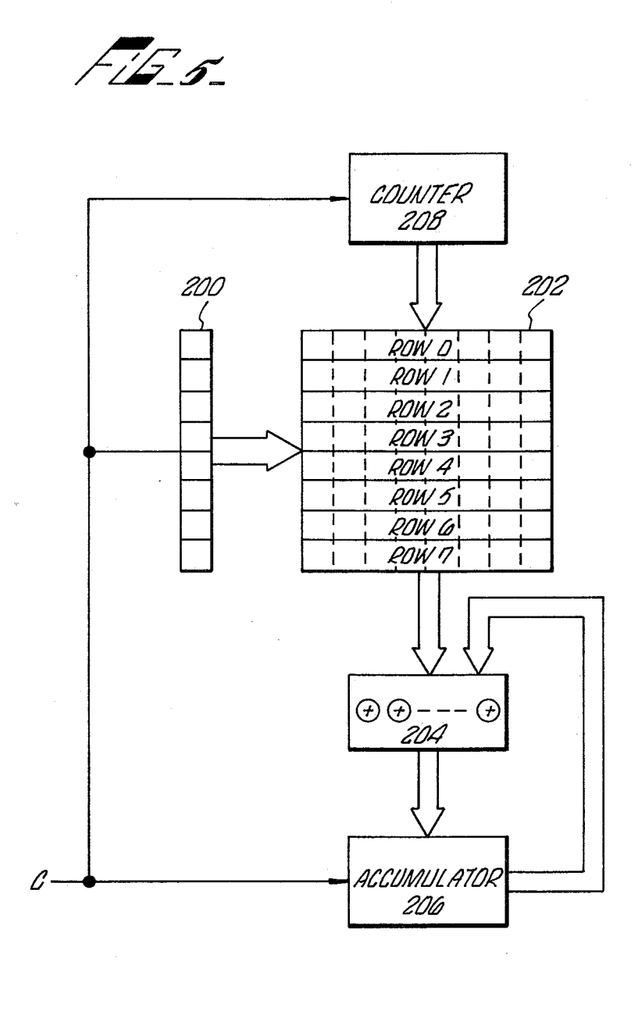
FIG. 5 is a block diagram of one embodiment (multiplication of vector-by-matrix row) of the error check unit of FIG. 1.
Figure 6:
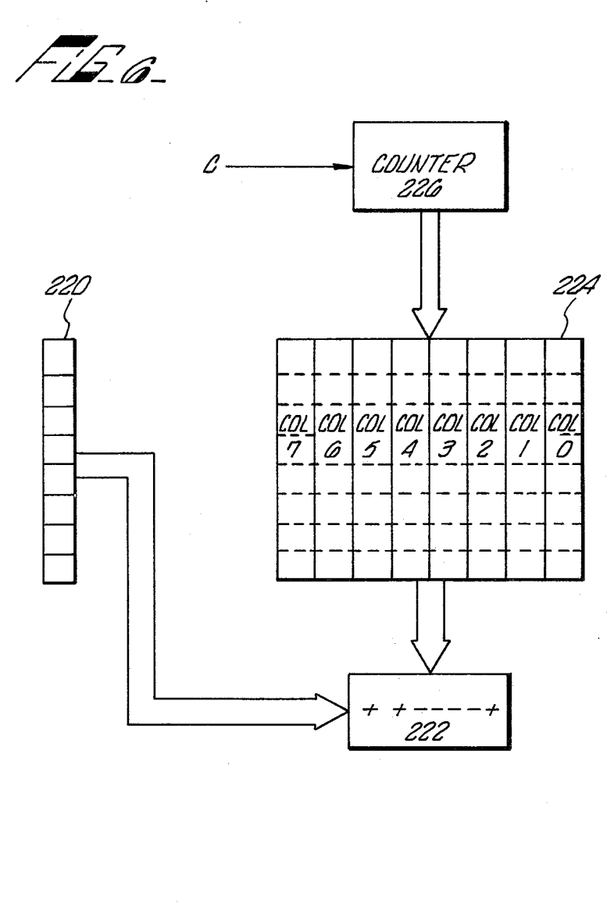
FIG. 6 is a block diagram of another embodiment (multiplication of vector-by-matrix column) of the error check unit of FIG. 1.
Figure 11:
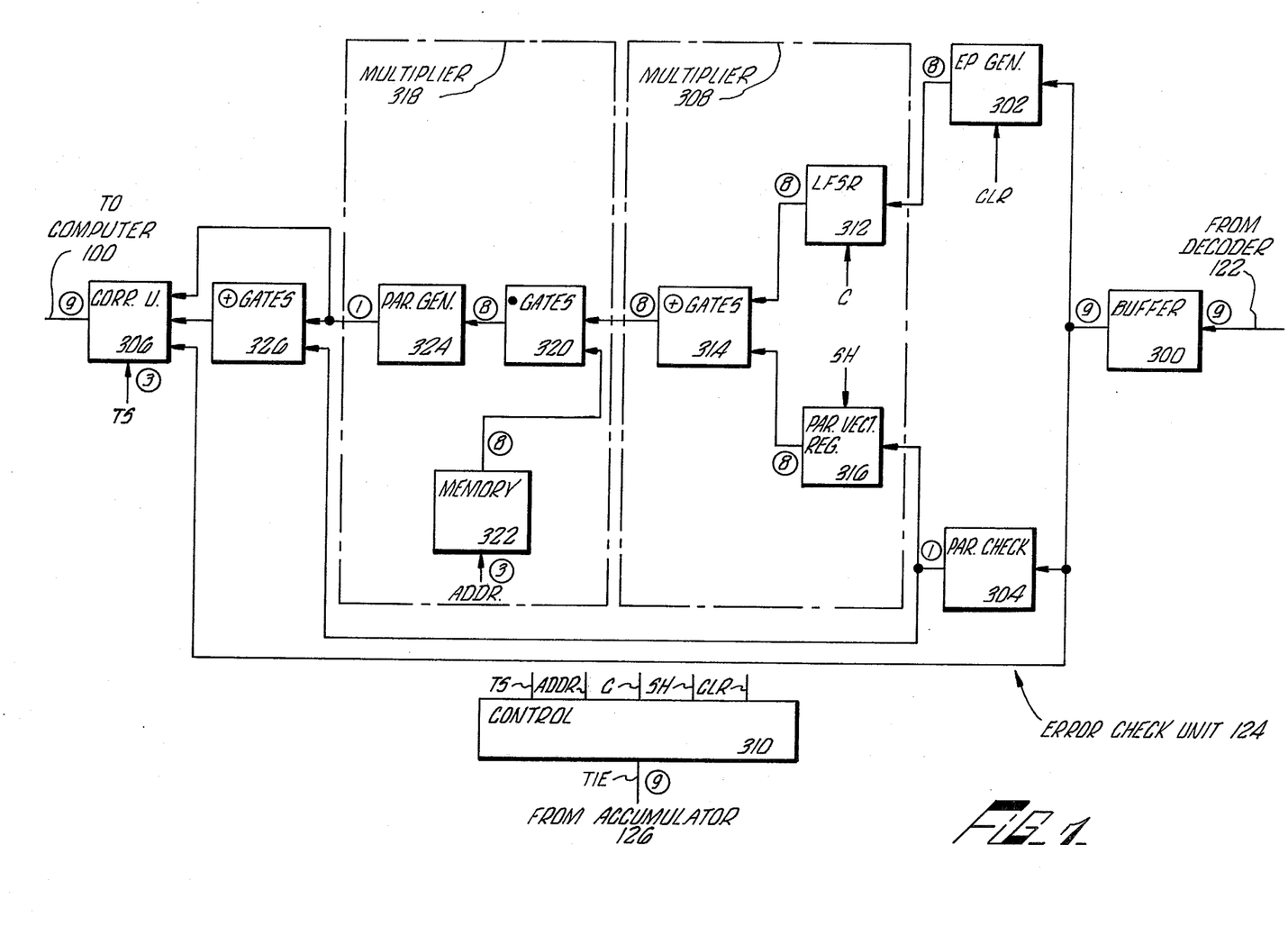

The error check equations (the above-derived expressions for $E(X)$), $E(Y)$ require techniques for matrix multiplication; two of these are shown in FIGS. 5 and 6, the former of which contemplates multiplication of vector by matrix row and the latter of which contemplates multiplication of vector by matrix column.

In FIG. 5, as synchronized by clock signal C, each vector element, stored in shift register 200, is "AND"ed with the corresponding matrix row, stored in memory 202, and the rows are then added modulo 2 by exclusive OR gates 204 to produce the product transferred to accumulator 206. Addressing of memory 202 is accomplished by outputs of counter 208, which of course, may comprise three memory elements for the eight rows. Since, when not enabled, outputs of memory 202 are all zeros, and AND function is provided.

In operation, the vector is stored in register 200, counter 208 is at zero (addressing row 0 of memory 202) and accumulator 206 is cleared. After eight clock signals C, the product is contained in accumulator 206. It is noted that, with this technique, no part of the matrix product is available until after 8 clock periods have elapsed.

In FIG. 6, the entire vector, stored in register 220, is "AND"ed bit by bit in AND gates 222 with a column of memory 224 as addressed by counter 226. The modulo 2 sum of the 8 bit result is one bit of the matrix product. It is noted that, with this technique, the matrix product is generated serially with the first bit available for use after one clock period.

The multiplication techniques of FIGS. 5 and 6 apply generally to any vector-matrix multiplication. In implementing the error correction equations, however, a fixed, ordered set of known matrices S(Y) are factors in the multiplication and therefore a special property of the set is involved, i.e., the product, resulting from multiplication of a vector by one of these matrices, is equal to the product of the same vector and the next higher order matrix shifted left. This means that the product of, for instance, matrix S7 and vector pattern EP may be formed by first multiplying vector EP and matrix S8 and then shifting left in a linear feedback shift register once; likewise, the product for matrix S6 and vector EP equals the product of vector EP and matrix S8 after two left shifts.

This characteristic is due to the structure of matrix S8 (FIG. 4), namely a reverse identity matrix:

$$S8 = \begin{array}{l}00000001\\00000010\\00000100\\00001000\\00010000\\00100000\\01000000\\10000000\end{array}$$

The product of a vector times this matrix will simply be the mirror image of the vector itself. Thus, for the first matrix multiplication, it is possible to reverse the vector (which requires no additional clock periods) and then shift the appropriate number of times to form the desired product. This reduces the amount of memory necessary and, more significantly, reduces the total number of operations required for finding and correcting a single track in error which has not been flagged by a signal TIE.

Correction of a single track with no TIE signal involves a search for the track-in-error. As already shown, when vector EP is multiplied by the matrix for the track-in-error, the product is equal to parity vector P. Thus, by using the technique of FIG. 6, the search can be completed by shifting the reversed error pattern until the track is identified; if no track is found after seven shifts, the errors are uncorrectable by the system.

FIG. 7, comprising a simplified block diagram of error check unit 124 of FIG. 4, embodies the aforementioned principles.

The data group (the encircled numerals represent parallel transfer of bits) enters unit 124 from decoder 122 and is stored in buffer 300 from which it is read out, a data character plus parity bit at a time, to error pattern (EP) generator 302, parity checker 304 and correction unit 306. Generator 302, which provides pattern EP, and parity checker 304, which provides parity vectors P, feed into multiplier 308, which, as comparison with FIG. 6 shows, uses the reverse-and-shift technique, to perform the matrix multiplication of its inputs; the shift, synchronized by signal C emitted by control 310, occurs in linear feedback shift register 312 and the modulo 2 addition occurs in exclusive OR gates 314 fed by both register 312 and, as controlled by synchronization (shift) signals from control 310, by parity register 316. Accordingly, the input to multiplier 318, received from multiplier 308, represents the term $P \oplus EP \oplus S(Y)$ of the equation for pattern E(X). This signal, the vector input to the matrix multiplication, is added in AND gates 320 to the matrix columns stored in memory 322, the latter as sequentially addressed by control 310. Parity generator 324 then operates on the 8-bit signals to produce, serially, the bits of pattern E(X). Signals E(X) and P, as shown, are combined in NOR gate 326 to thereby form signal E(Y). Signal TIE, if generated, is fed from accumulator 126 to control 310 and, as the data group passes through correction unit 306 which may be a buffer register, it is corrected, if appropriate, in accordance with signals E(X), E(Y) at locations identified by signal TIE as converted (if desired, by control 310) into track select signal TS.

As is seen from FIG. 7, then, in its preferred form, the error check system of this invention may be divided into two functional sections. The first of these forms the error pattern and partial solution, which is then transferred to the second section which completes the solution and corrects the data group.

It may be appropriate to tabulate all combinations of error conditions and the operations they require in the system presently being considered:

| correction type | error conditions | correction operations | | |
|---|---|---|---|---|
| | | form partial solution | | complete solution & correct |
| 1 | single tie* (not parity track) | form & reverse EP* | 8 right shifts of EP check EP = Pv | correct with Pv |
| 2 | two ties (X,Y) (not parity track) | form & reverse EP | 8 right shifts of EP SOL* = EP $\oplus$ Pv | correct Y with SOL $\oplus$ S(d) correct X with [SOL $\oplus$ S(d)] $\oplus$ Pv |
| 3 | no flagged tracks | form & reverse EP | right shift until EP = Pv | correct X with Pv |
| 4 | parity tie only | — | — | correct parity tie with Pv |
| 5 | parity tie & one other tie (X) | form & reverse EP | 8 right shifts of EP SOL = EP | correct X with SOL; correct parity tie with SOL $\oplus$ Pv |
| 6 | more than two ties | — | — | no correction; flag error |
| 7 | no errors | form & reverse EP | check for EP = Pv = 0 | no correction |

*tie denotes track-in-error
EP denotes both the original error pattern and the result after the shift operation.
SOL denotes "solution"

It is recognized that the drawings and this description provide a rather broad teaching of the present invention. It is submitted that this is justified in view of the supplementary information easily available to those skilled in the computer arts. It is submitted that the logic and detailed circuitry may be structured by such practitioners along the guidelines established in such works as the book "Logical Design of Digital Computers" by Montgomery Phister, Jr., Wiley, N. Y. 1958. Also, it will readily be appreciated that this specification implies no structural limitation to those acquainted with computers or logic design; in brief, the present description should be considered exemplary for teaching those skilled in the computer arts and not constrained to the showing herein or in the aforementioned reference.

What is claimed is:

1. In an automatically performable, electronically implemented error checking and correcting method for use in conjunction with a multichannel digital signal transfer system, the steps of:

assembling the digital signals which are to be transferred into a plurality of multicharacter data words of common character bit length arranged so that each character is in a cross-channel direction with like bits of different characters in respective channels;

generating a check character having said common character bit length in response to the bits contained in each data word to be transferred using a cyclical code chosen so that the resulting check character can be logically combined with its respective data word to provide a representation of single bit errors as a set of unique ordered syndrome matrices, one for each channel, said matrices being related to each other in a manner such that the product resulting from the multiplication of a vector by one matrix is equal to the product of the same vector and the next higher order matrix shifted in a predetermined direction, each syndrome matrix containing a plurality of different error patterns respectively corresponding to single bit errors occuring in particular bit positions of the respective channel;

appending each generated check character to its respective data word in the same cross-channel direction as the other characters in the word;

logically combining the check character and data word of a transferred data group to form an error pattern vector representative of bit errors therein;

generating a first product of said error pattern vector and a first one of said syndrome matrices; and generating a second product of said error pattern and a second one of said matrices by shifting said first product a predetermined number of times in a predetermined direction as determined by the difference in the orders of said first and second matrices.

2. The invention in accordance with claim 1, wherein said cyclic code is chosen so that said first syndrome matrix is a reverse identity matrix such that the product of a vector times this reverse identity matrix is the reverse of the vector, and wherein the step of generating said first product is performed by reversing said error pattern vector.

3. The invention in accordance with claim 2, including the steps of:

generating a parity bit for each character of a data word so as to form a parity vector;

appending the generated parity bits of the parity vector to respective characters of each data word in a parity channel provided in each data group; and generating a channel error vector indicating the presence of an error in one or more bit positions of a particular channel of a data word by steps including logically combining said parity vector with at least one product of said error pattern vector and one of said syndrome matrices, said at least one product being generated in a like manner as said second product.

4. The invention in accordance with claim 3, including the step of correcting one or more bit errors in a channel of a data word by logical combination thereof with a corresponding channel error vector.

5. The invention in accordance with claim 4 including the step of:
generating a channel-in-error signal which is independent of said parity and error pattern vectors for indicating the likely presence of an error bit in a particular one or more channels of a data group; and wherein said step of correcting employs said channel-in-error signal for determining which of the channels of a data word are to be corrected.

6. The invention in accordance with claim 3 wherein the step of generating said check character includes combining the N characters of a data word in accordance with the equation $E = F \pmod{G}$ where $F = D1X^N + D2X^{N-1} + \ldots - DNX$ and G is selected so that repeating the calculation of $E = F \pmod{G}$ with E included with the same data word produces a character having the same value for all digits.

7. The invention in accordance with claim 6:
wherein said step of generating a channel error vector includes generating an X channel error vector E(X) in accordance with the equation:

$$E(X) = [P \oplus EP \oplus K1] \oplus K2$$

and generating a Y channel error vector E(Y) in accordance with the equation:

$$E(Y) = P \oplus E(X)$$

where P is said parity vector, EP is the error pattern produced by operating on the data word and check character of a transferred data group in accordance with the equation of $EP = F \pmod{G}$, K1 is the syndrome matrix S(Y), and K2 is an inverse matrix related to the track separation between X and Y; and
wherein the product $EP \oplus K1$ is calculated as defined for said second products.

8. The invention in accordance with claim 7, wherein the product of the vector $[P \oplus EP \oplus K1]$ and the matrix K2 is generated by ANDing the vector bit-by-bit with each column of the matrix such that the modulo sum and the ANDed bits in each column is one bit of the resultant product.

9. In an error checking and correcting system for use in a multichannel digital signal transfer system, the combination comprising:
means for assembling the digital signals which are to be transferred into a plurality of multicharacter data words of common character bit length arranged so that each character is in a cross-channel direction with like bits of different characters in respective channels;

means for generating a check character having said common character bit length in response to the bits contained in each data word to be transferred using a cyclical code chosen so that the resulting check character can be logically combined with its respective data word to provide a representation of single bit errors as a set of unique ordered syndrome matrices, one for each channel, said matrices being related to each other in a manner such that the product resulting from the multiplication of a vector by one matrix is equal to the product of the same vector and the next higher order matrix shifted in a predetermined direction, each syndrome matrix containing a plurality of different error patterns respectively corresponding to single bit errors occuring in particular bit positions of the respective channel;

means for appending each generated check character to its respective data word in the same cross-channel direction as the other characters in the word;

means for logically combining the check character and data word of a transferred data group to form an error pattern vector representative of bit errors therein;

means for generating a first product of said error pattern vector and a first one of said syndrome matrices; and shifting means to which said first product is applied for generating a second product of said error pattern vector and a second one of said matrices by shifting said first product a predetermined number of times in a predetermined direction as determined by the difference in the orders of said first and second matrices.

10. The invention in accordance with claim 9, wherein said cyclic code is chosen so that said first syndrome matrix is a reverse identity matrix such that the product of a vector times this reverse identity matrix is the reverse of the vector, and wherein said means for generating said first product comprises means for reversing said error pattern vector.

11. The invention in accordance with claim 10, including:
means for generating a parity bit for each character of a data word so as to form a parity vector;

means for appending the generated parity bits of the parity vector to respective characters of each data word in a parity channel provided in each data group;

means operating in conjunction with said second product generating means for generating a channel error vector indicating the presence of an error in one or more bit positions of a particular channel of a data word by logically combining said parity vector with at least one product of said error pattern vector and one of said syndrome matrices.

means for generating a channel-in-error signal which is independent of said parity and error pattern vectors for indicating the likely presence of an error bit in a particular one or more channels of a data group; and means for correcting one or more bit errors in a channel of a data word in response to said channel error vector and at least one of said parity vector and said channel-in-error signal.

12. The invention in accordance with claim 11:

wherein said check character is generated by combining the N characters of a data word in accordance with the equation $E = F \pmod{G}$ where $F = D1X^N + D2X^{N-1} + ---- DNX$ and G is selected so that repeating the calculation of $E = F \pmod{G}$ with E included with the same data word produces a character having the same value for all digits;

wherein a first channel error vector E(X) is generated in accordance with the equation:

$$E(X) = [P \oplus EP \oplus K1] \oplus K2$$

and a second channel error vector E(Y) is generated in accordance with the equation:

$$E(Y) = P \oplus E(X)$$

where $P$ is said parity vector, $EP$ is the error pattern produced by operating on the data word and check character of a transferred data group in accordance with the equation $EP = F \pmod{G}$, K1 is the syndrome matrix S(Y), and K2 is an inverse matrix related to the track separation between X and Y; and wherein the product $EP \oplus K1$ is generated by reversing EP and shifting the result a predetermined number of times in a predetermined direction as determined by the difference in the orders of said identity matrix and the matrix K1.

* * * * *

UNITED STATES PATENT OFFICE
CERTIFICATE OF CORRECTION

Patent No. 4,052,698             Dated     October 4, 1977

Inventor(s)   Herbert U. Ragle

It is certified that error appears in the above-identified patent and that said Letters Patent are hereby corrected as shown below:

Col. 1, line 11, change "ratio" to --radio--;
        line 61, change "count" to --counts--.
Col. 2, line 12, change "module" to --modulo--;
        line 68, change "stances" to --stance--.
Col. 4, line 26, change "67" to --7--.
Col. 5, line 27, change "$G = X^0 + X^3 + X^4 X^5 + X^8$" to
             --$G = X^0 + X^3 + X^4 + X^5 + X^8$--;

line 32, change "As" to --An--;
        lines 38-52, correct righthand decode portion of the table as follows:

```
              --decode
             11111111
             11111111
             11111111
             11111111
             11111111
             11111111
             11111111
             11010001
          100001001010101
      -       100111001
              011011011
      -       100111001
              011110001
      -       100111001
              100111001
      -       100111001
              000000000   EP (error pattern)--.
```

UNITED STATES PATENT OFFICE
CERTIFICATE OF CORRECTION

Patent No. 4,052,698                     Dated   October 4, 1977

Inventor(s)  Herbert U. Ragle

It is certified that error appears in the above-identified patent and that said Letters Patent are hereby corrected as shown below:

Col. 6, line 6, change "state" to --stated--;
line 8, change "$\oplus$" to --$\otimes$--;
line 15, change "$\oplus$" to --$\otimes$--;
line 20, change "$\oplus$" to --$\otimes$--;
line 30, change "tha" to --that--.
Col. 7, line 4, between "EP(Y)" and "S(Y)", insert --$\otimes$--;
line 5, change "$\oplus$" to --$\otimes$--;
line 9, between "EP" and "S(Y)", insert --$\otimes$--;
between "EP(X)" and "S(Y)", insert --$\otimes$--;
line 10, change "$\oplus$ S(Y) $\oplus$ [E(X) $\oplus$ S(X)] $\oplus$ S(Y)" to
--$\otimes$ S(Y) $\oplus$ [E(X) $\otimes$ S(X)] $\otimes$ S(Y)--;
line 12, change "$\oplus$", first and second occurrence, to --$\otimes$--;
line 14, change "E(X) $\oplus$ E(X) $\oplus$ S(X) $\oplus$ S(Y) = P $\oplus$ EP $\oplus$ S(Y)" to
--E(X) $\oplus$ E(X) $\otimes$ S(X) $\otimes$ S(Y) = P $\oplus$ EP $\otimes$ S(Y)--;
line 17, change "E(X) $\oplus$ [I $\oplus$ S(X) $\oplus$ S(Y)] = P $\oplus$ EP $\oplus$ S(Y)" to
--E(X) $\otimes$ [I $\oplus$ S(X) $\otimes$ S(Y)] = P $\oplus$ EP $\otimes$ S(Y)--;
line 23, change "$\oplus$", second occurrence, to --$\otimes$--;
line 24, change "E(X) = [P $\oplus$ EP $\oplus$ S(Y)] $\oplus$ [I $\oplus$ S(X) $\oplus$ S(Y)]$^{-1}$" to
--E(X) = [P $\oplus$ EP $\otimes$ S(Y)] $\otimes$ [I $\oplus$ S(X) $\otimes$ S(Y)]$^{-1}$--;
line 32, change "E(X) = [P(X) $\oplus$ EP $\oplus$ K1] $\oplus$ K2" to
--E(X) = [P(X) $\oplus$ EP $\otimes$ K1] $\otimes$ K2--;
line 37, change "$\oplus$", second occurrence, to --$\otimes$--.
Col. 8, line 37, change "$\oplus$", second occurrence, to --$\otimes$--.
Col. 9, line 10, under the read group portion of the table
change "10100001" to --10100001--;
line 37, change "$\oplus$" to --$\otimes$--;
line 44, change "E(X)), E(Y)" to --E(X), E(Y))--.

UNITED STATES PATENT OFFICE
CERTIFICATE OF CORRECTION

Patent No. 4,052,698      Dated October 4, 1977

Inventor(s) Herbert U. Ragle

It is certified that error appears in the above-identified patent and that said Letters Patent are hereby corrected as shown below:

Col. 11, line 1, change "$\oplus$", second occurrence, to --$\otimes$--;

line 32, under the complete solution & correct portion of the table change "SOL$\oplus$S(d) correct" to --SOL$\otimes$S(d) correct--;

line 33, change "X with [SOL$\oplus$S(d)]" to --X with [SOL$\otimes$S(d)]--.

Col. 13, line 40, change "E(X) = [P$\oplus$EP$\oplus$K1]$\oplus$K2" to --E(X) = [P$\oplus$EP$\otimes$K1]$\otimes$K2--;

line 54, change "$\oplus$" to --$\otimes$--;

line 57, change "$\oplus$", second occurrence, to --$\otimes$--;

line 60, change "and" to --of--.

Col. 15, line 12, change "E(X) - [P$\oplus$EP$\oplus$K1]$\oplus$K2" to --E(X) = [P$\oplus$EP$\otimes$K1]$\otimes$K2--.

Col. 16, line 10, change "$\oplus$" to --$\otimes$--.

Signed and Sealed this

Second Day of May 1978

[SEAL]

Attest:

RUTH C. MASON      LUTRELLE F. PARKER
Attesting Officer      Acting Commissioner of Patents and Trademarks